June 6, 1933.  R. F. SHIPMAN  1,913,296
WEIGHING SCOOP
Filed May 11, 1931  2 Sheets-Sheet 1
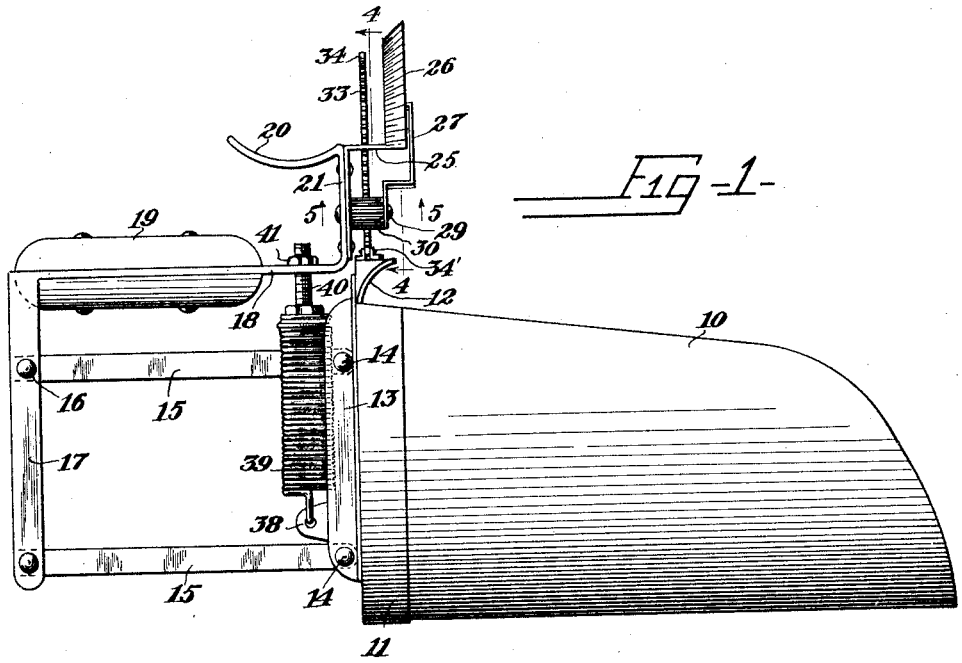
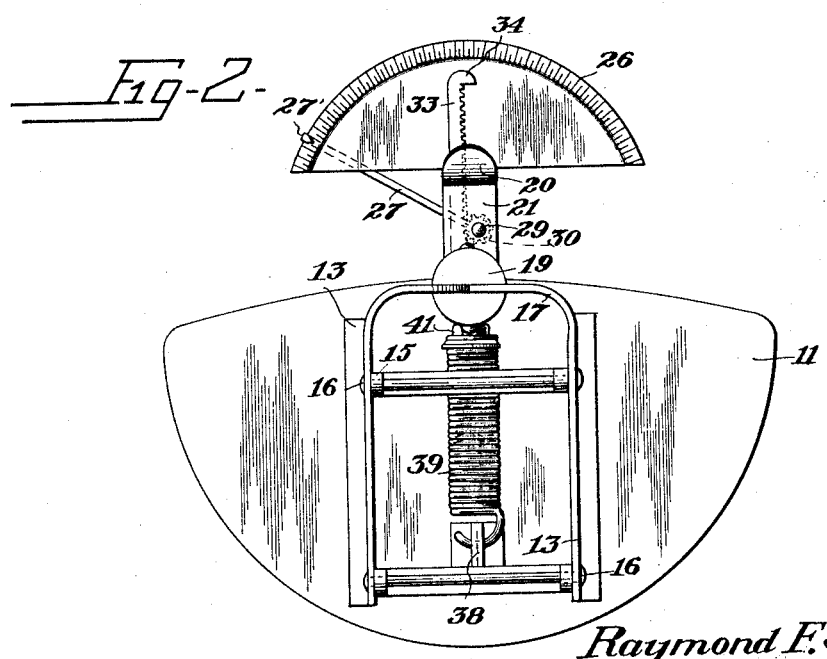
Raymond F. Shipman
INVENTOR
BY Victor J. Evans
and Co. ATTORNEY June 6, 1933.                 R. F. SHIPMAN                 1,913,296
                              WEIGHING SCOOP
                      Filed May 11, 1931        2 Sheets-Sheet 2
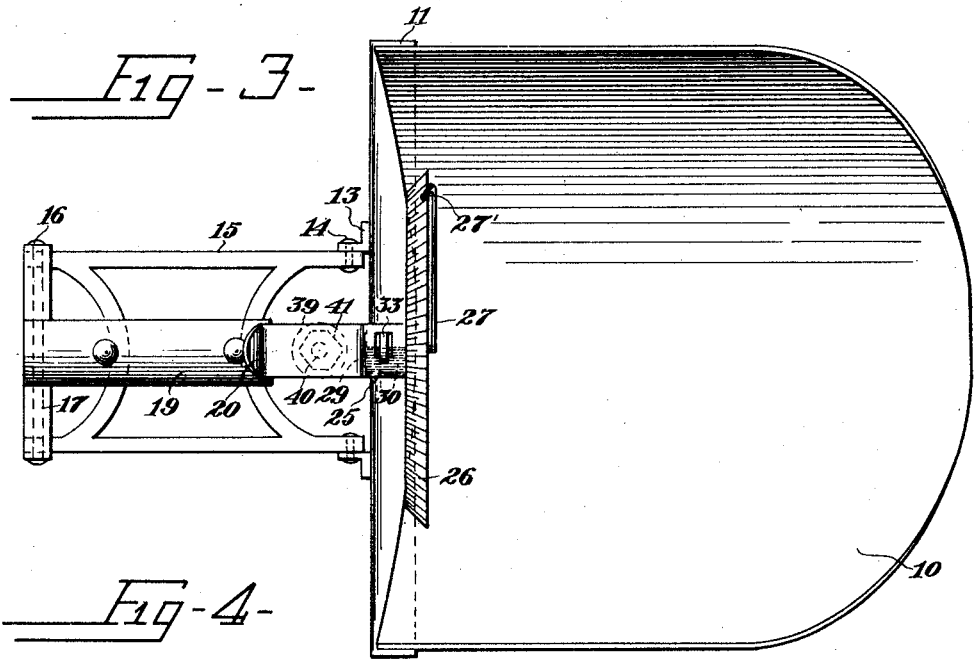
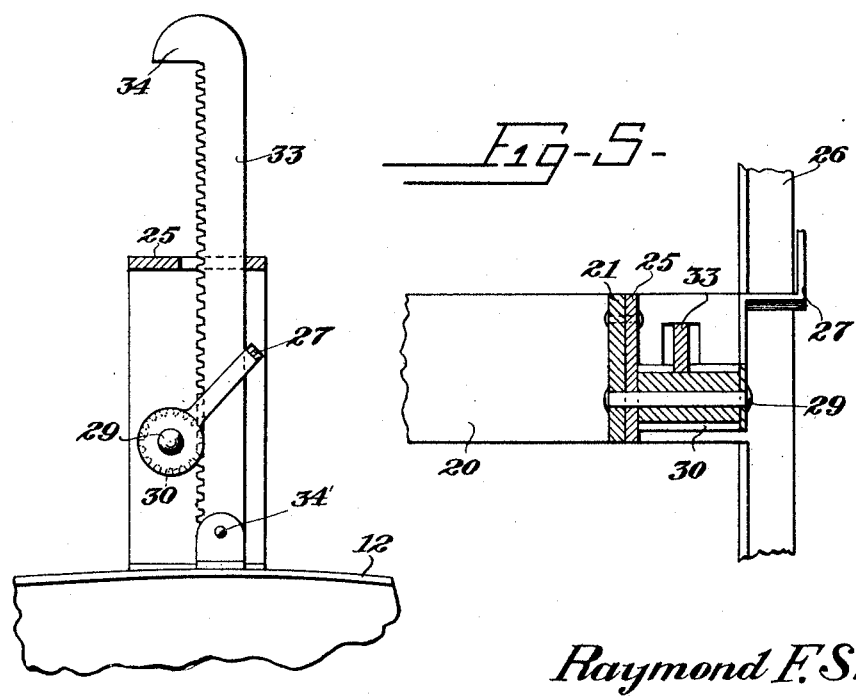
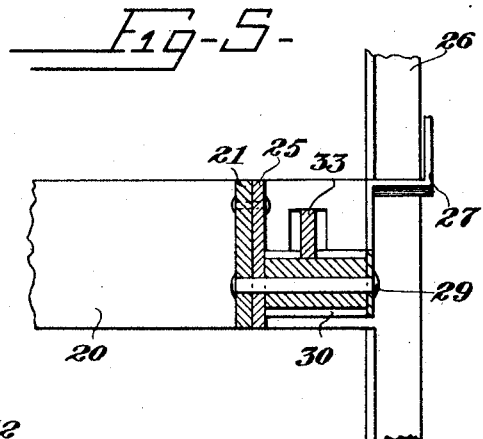
Raymond F. Shipman
INVENTOR
BY Victor J. Evans
and Co.   ATTORNEY Patented June 6, 1933

1,913,296

UNITED STATES PATENT OFFICE

RAYMOND F. SHIPMAN, OF MONTGOMERY, NEW YORK

WEIGHING SCOOP

Application filed May 11, 1931. Serial No. 536,556.

The object of this invention is to provide a scoop for use in handling sugar and like material, wherein the weighing mechanism is so mounted with reference to the handle and the scoop per se that no interference with the use of either of these members will be experienced, and accurate results will be attainable by employing structure of a relatively simple and inexpensive type.

With the foregoing and other objects in view, the invention consists in the novel construction and arrangement herein disclosed, and illustrated in the drawings, it being understood that changes or modifications may be made within the scope of the claims, without departing from the spirit of the invention.

In the drawings:—

Figure 1 is a view of the scoop, with the weighing means applied thereto, all of the structure being in elevation.

Figure 2 is a view in elevation looking from the left in Figure 1.

Figure 3 is a top plan view.

Figure 4 is a detail in section on line 4—4 of Figure 1 and showing rack and pinion mechanism for actuating the pointer cooperating with the scale,—the pinion carrying the pointer, and the rack having connection with the rear wall of the scoop.

Figure 5 is a detail in section on line 5—5 of Figure 1.

A scoop of substantially usual configuration is employed and includes the concaved or channel-like element 10 having a rear wall 11 connected therewith, and having a bracket 12 connected with said rear wall or with the scoop per se.

Also connected with said rear wall are vertical parallel bars 13 which may be of the angle type, and these bars support by means of pivotal connections shown at 14, a plurality of outwardly extending members 15 which have pivotal connections at 16 with a rear yoke 17.

The yoke 17 is formed with or connected with the horizontally extending portion 18 having a grip or handle 19 by means of which the scoop is manipulated. A thumb member 20 extends rearwardly from an upstanding portion 21, the latter being formed with or connected with element or elements 18, and thus the operator or user of the device may not only obtain sufficient thrust by the use of element 19, for forcing the scoop into the material to be handled, but by producing engagement between the thumb and element 20, he may steady the weighted scoop so that the scale mechanism to be described will register accurately.

Connected with upstanding member 21 heretofore referred to is a bracket 25 having a segmental scale 26 thereon and cooperating with the latter is a pointer 27 having its end portion deflected at 27', so that it overlaps the beveled and graduated portion of the scale, and the weight may be read from the rear, thereby enabling the user to obtain the results in pounds or ounces, immediately upon removing the scoop from the bulk of material from which a given portion is withdrawn.

In order to provide for the actuation of the pointer, I mount the latter on an axial element 29 rigid with reference to a pinion 30, the latter being mounted by said element 29 on the upstanding element 21.

For cooperation with pinion 30, I provide a rack bar or rack element 33 shown in Figures 2 and 4 of the drawings as having an upper offset end 34, said rack bar being pivoted or connected at 34' with the bracket 12 before referred to. It will be recalled that bracket 12 is fixed with reference to the rear portion of the scoop.

A bracket 38 is also connected with the rear portion of the scoop, and a tension spring 39 is connected with said bracket 38, and is also connected with the threaded stem 40 passing through element 18 and engaged by a nut 41, whereby the spring may be adjusted. The adjustment involves the registration of the pointer 27 with a zero mark on the scale, or similar starting point, the weight of the scoop per se being allowed for. All material carried by the scoop will then produce a movement, corresponding with its bulk, between the scoop and the relatively stationary element 18, whereby, because of this movement, the rack bar 33 will receive a downward pull, and will rotate pinion 30, producing a movement of the pointer 27 corresponding with the weight in ounces or pounds of the material received by said scoop.

Having described the invention, what I claim is:—

1. In a device of the class described, a handle having a depending substantially U-shaped portion at its outer end and an upstanding portion at its opposite end, a scoop having a closed rear wall, links pivotally connected with the closed rear wall and the U-shaped portion for the swinging of the scoop, an expansible spring connected with the handle and scoop, a scale dial on the upstanding portion, a rotatable pointer carried by said upstanding portion and coacting with the dial, and means engaged with the scoop and pointer and operative by a load when within the scoop for moving the said pointer over the scale dial.

2. In a device of the class described, a handle having a depending substantially U-shaped portion at its outer end and an upstanding portion at its opposite end, a scoop having a closed rear wall, links pivotally connected with the closed rear wall and the U-shaped portion for the swinging of the scoop, an expansible spring connected with the handle and scoop, a scale dial on the upstanding portion, a rotatable pointer carried by said upstanding portion and coacting with the dial, means engaged with the scoop and pointer and operative by a load when within the scoop for moving the said pointer over the scale dial, and a finger rest turned from the upstanding portion to overhang the fore part of the handle.

In testimony whereof I affix my signature.

RAYMOND F. SHIPMAN.